(12) United States Patent
Eich et al.

(10) Patent No.: US 8,940,082 B2
(45) Date of Patent: Jan. 27, 2015

(54) FILTER ELEMENT FOR AN EXTRACTOR HOOD AND EXTRACTOR HOOD

(75) Inventors: Holger Eich, Rheinstetten (DE); Andrzej Goczol, Niefern-Öschelbronn (DE); Jochen Klemm, Sandhausen (DE); Ralf Knoch, Karlsruhe (DE); Ulmar Neumann, Forst (DE); Anja Presse, Eppingen (DE); Udo Reiff, Knittlingen (DE); Martina Schnatz, Bretten (DE); Paul Seyfrid, Baden-Baden (DE); Maja Wehrle, Karlsruhe (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 206 days.

(21) Appl. No.: 13/511,154

(22) PCT Filed: Nov. 5, 2010

(86) PCT No.: PCT/EP2010/066931
§ 371 (c)(1),
(2), (4) Date: Jun. 12, 2012

(87) PCT Pub. No.: WO2011/064083
PCT Pub. Date: Jun. 3, 2011

(65) Prior Publication Data
US 2012/0240773 A1    Sep. 27, 2012

(30) Foreign Application Priority Data
Nov. 30, 2009   (DE) .................... 20 2009 016 200 U

(51) Int. Cl.
*B01D 53/02*    (2006.01)
*F24C 15/20*    (2006.01)
*B01D 46/00*    (2006.01)
(Continued)

(52) U.S. Cl.
CPC ........ *F24C 15/2035* (2013.01); *B01D 46/0038* (2013.01); *B01D 46/10* (2013.01); *B01D 46/521* (2013.01); *B01D 53/44* (2013.01);
(Continued)

(58) Field of Classification Search
USPC ........................................ 96/134, 152–154
See application file for complete search history.

(56) References Cited

U.S. PATENT DOCUMENTS 3,217,470 A * 11/1965 Omohundro .................... 96/224
3,487,625 A    1/1970 Lucas
(Continued)

FOREIGN PATENT DOCUMENTS

DE    202009017271 U1    3/2010
GB          888823         2/1962
(Continued)

OTHER PUBLICATIONS

International Search Report PCT/EP2010/066931.

*Primary Examiner* — Christopher P Jones
(74) *Attorney, Agent, or Firm* — James E. Howard; Andres Pallapies

(57) ABSTRACT

A filter element for an extractor hood includes an odor filter having depressions provided in an entry side of the filter element and extending at least over half of a height of the filter element. A frame holds the odor filter at its edges and has a height which is smaller at least on one side of the frame than a height of the odor filter.

17 Claims, 3 Drawing Sheets

(51) Int. Cl.
*B01D 46/10* (2006.01)
*B01D 46/52* (2006.01)
*B01D 53/44* (2006.01)

(52) U.S. Cl.
CPC ..... *B01D2239/045* (2013.01); *B01D 2253/102* (2013.01); *B01D 2257/90* (2013.01)
USPC .................. 96/134; 96/152; 96/153; 96/154

(56) References Cited

U.S. PATENT DOCUMENTS

| | | |
|---|---|---|
| 4,350,504 A | 9/1982 | Diachuk |
| 4,600,419 A | 7/1986 | Mattison |
| 4,770,118 A | 9/1988 | Vohringer |
| 4,940,470 A | 7/1990 | Jaisinghani |
| 5,158,586 A | 10/1992 | Layton |
| 5,551,984 A | 9/1996 | Tanahashi |
| 6,344,074 B1 * | 2/2002 | Ward et al. ............... 96/399 |
| 2008/0047430 A1 | 2/2008 | Kobori |
| 2012/0067215 A1 | 3/2012 | Lindahl et al. |

FOREIGN PATENT DOCUMENTS

| | | |
|---|---|---|
| WO | 0191886 A1 | 12/2001 |
| WO | 03086793 A1 | 10/2003 |

* cited by examiner

FILTER ELEMENT FOR AN EXTRACTOR HOOD AND EXTRACTOR HOOD

BACKGROUND OF THE INVENTION

The invention relates to a filter element for an extractor hood and to an extractor hood Known filter elements in extractor hoods for filtering out or separating odorous substances generally comprise a design whereby a filter material mat consisting of foam and charged with active carbon is encased with a non-woven fabric. The active carbon mat can herewith be placed in a plastic frame, to which the non-woven fabric material is welded on the upper side and the lower side.

One disadvantage of these known odor filters in extractor hoods consists in the size of the effective filter surface, over which the air to be cleaned can enter the filter material mat, being small. In order consequently to realize adequate cleaning of the air of odorous substances, it may therefore be necessary to provide several filter elements. This can however not be realized or only conditionally on account of the installation space available in the extractor hood. Alternatively, the height or thickness of the filter material mat can be selected to be large. This results, though, in increased air resistance, which in turn results in increased noise development.

BRIEF SUMMARY OF THE INVENTION

The object of the present invention is therefore to create a filter element for an extractor hood and an extractor hood, with which, with minimal noise development, a reliable cleaning of polluted air, in particular vapor and steam, of the odorous substances is possible.

The knowledge underlying the invention can achieve this object, as the flow resistance which is generated by the filter element is minimized. In particular, at least one air duct is provided at least in the entry side of the filter element, which extends in the height direction of the filter element.

According to a first aspect of the invention, the object is therefore achieved by a filter element for an extractor hood, which includes an odor filter. The filter element is characterized in that depressions are provided in the entry side of the filter element, said depressions being formed by the odor filter and extending at least over the half of the height of the filter element.

The dimension which lies in the main flow direction of the incoming air, in other words parallel thereto, is referred to as the height. The height of the filter element generally represents the distance between the lower side and the upper side of the filter element in the assembled state. The dimensions which lie at right angles to the main flow direction are referred to as width and depth. In particular, the distance between the lateral ends of the filter element is referred to as the width of the filter element. The distance between the front end and the rear end of the integrated filter element is referred to as the depth of the filter element. Unless otherwise specified, the references above, below, front and rear are used with respect to an assembled extractor hood and filter element mounted therein.

The inventive filter element includes an odor filter. Part of the filter element, in which the filter material is contained or is formed by the filter material, is herewith referred to as the odor filter. In accordance with the present invention, the filter material may comprise active carbon or consist of active carbon. Active carbon with additives, like catalysts, other odor-binding or odorous substance-destroying materials can also be used as filter material for instance. These filter materials also form the odor filter or are contained therein.

The side on which the filter element is passed through by the air to be cleaned is referred to as the entry side of the filter element. The entry side of the filter element is therefore generally the lower side of the filter element.

By depressions being provided in the filter in the entry side, which are formed by the odor filter and extend at least over half of the height of the filter element, the filter surface over which air to be cleaned can enter the odor filter and as a result the filter material is enlarged. The air resistance, which is produced by entry of air into the odor filter, is herewith reduced and the air volume flowing through the filter is increased. In accordance with the invention, the depression is bounded by an exterior of the odor filter. The entire surface in the depression therefore represents a filter surface. In this respect a distinction is made between the inventively provided depressions and the cavities which are formed inside conventional odor filters. Furthermore, the depressions are preferably formed in accordance with the invention such that these are formed by surfaces which extend across the entire width or depth of the odor filter. The surfaces may represent flat surfaces, which are inclined relative to one another. Alternatively, the surfaces may however also represent curved surfaces, which are curved oppositely to one another. The depressions herewith form air duct channels, the width of which reduces from the entry side of the filter element across the height of the depression. The inventively provided depressions may therefore prevent air turbulence. In the inventive filter element, the at least two surfaces, which form a depression in each instance, are inclined relative to the main flow direction of the air to be cleaned. The entry of the air to be cleaned into the odor filter is herewith favorable.

The filter element may comprise for instance a width of 150-200 mm for instance, preferably 230 mmm and a depth of 150-250 mm, preferably 190 mm. The height of the filter element may lie for instance in the range of 30-120 mm and preferably 50 mm. In the inventive filter element, this relatively great height can maximize the filter surface of the odor filter.

The odor filter preferably has a constant thickness over its surface. By the thickness over the surface of the odor filter being constant, a backing-up of air to be cleaned on the one hand and an uncontrolled passage of air through the odor filter on the other hand are prevented. Furthermore, manufacture of the filter element is simplified, since the removal of material for the formation of depressions in the odor filter is not necessary for instance. The depressions may instead be formed by reshaping the odor filter. The odor filter preferably represents a mat or platform in its raw state, in other words prior to reshaping. The thickness of the odor filter can be selected to be small in accordance with the invention. An odor filter can be used for instance which comprises a thickness of less than 10 mmm, for instance 5 mm.

The length of the odor filter is preferably greater than the width of the filter element. The dimension prior to reshaping the odor filter mat is understood to mean the length of the odor filter in a rectangular odor filter, said dimension being greater than the further dimensions. Alternatively, the width of the odor filter can be greater than the depth of the filter element. The dimension of the odor filter is understood as the width in the state prior to reshaping, which is greater than the thickness but less than the length of the odor filter.

By the dimension of the odor filter in its original state, in other words prior to reshaping, being greater in one direction than the corresponding dimension of the filter element in this direction, it is possible, despite the depressions to be provided by the odor filter, to cover the entire surface of the filter element by means of the odor filter. Polluted air is herewith prevented from passing through the filter element.

According to a preferred embodiment, the filter element includes a frame, in which the odor filter is held at its edges. The odor filter is preferably fastened on the frame at its edges, for instance fixed with adhesive. The provision of a frame stabilizes the filter element on the one hand, which also allows for the integration of the filter element in an extractor hood when the odor filter has a minimal thickness. On the other hand, the frame can be used as a lateral seal for the odor filter. The frame assumes this function particularly with such odor filters, in which a grainy or granulate-type filter material is held between the ceiling or cover layers. With these odor filters, the filter material is prevented from escaping through the frame at the sides. Finally, the shape or structure of the odor filter, which comprises this after reshaping, can also be retained by the frame. Stabilization of the odor filter over its surface is therefore not necessary. The frame preferably represents a plastic frame.

The odor filter is preferably folded or waved. In this form, the odor filter is used in the inventive filter element, in other words this form or structure of the odor filter represents a structure following a reshaping of the odor filter. Folding is understood within the meaning of the invention to mean a sharp deflection of the planar odor filter along a first line and a sharp deflection in the opposite direction along a further line which is in parallel with the first line. The angle which is produced by the sharp deflection of the odor filter can lie in the range of greater than zero up to 90° preferably however in the range of 5° to 20°. The folding creates V-shaped depressions in the lower side of the odor filter and in the upper side of the odor filter respectively. Waves are understood within the meaning of this invention to mean a deflection of the planar odor filter along a first line and a deflection in the opposite direction along a further line which is parallel to the first line. The angle which is produced by deflection of the odor filter can lie in the range of greater than zero up to 90° preferably however in the range of 5 to 20°. U-shaped depressions are therefore formed in each instance by the waves in the lower side of the noise filter and in the top side of the odor filter in each instance. The odor filter is folded or waved multiple times in accordance with invention, wherein the distance between the deflection points, in other words the folding or wave lines, is equally as great in each instance. The odor filter herewith defines a spatial structure.

Such a molding of the odor filter enables the surface of the odor filter, over which the air to be cleaned can enter the odor filter, to be maximized with a predetermined size of the filter element.

The surface of the odor filter which is enlarged by the waved or folded structure of the odor filter increases the odor reduction while lowering the negative effect of the air flow. The drop in pressure on the filter element and the noise development are thus minimized.

According to one embodiment, the folds or waves in the odor filter run in the width or depth direction of the filter element. With a rectangular planar odor filter, the stability of the structure of the odor filter can be increased by aligning these folds or waves.

The odor filter preferably includes a filter material layer, which is covered on the opposite surfaces with a coating layer in each instance, which is also referred to as cover layer or envelope layer. The opposite surfaces of the filter material layer are preferably its upper side and its lower side. In addition, the coating layer can however also be provided on the edge surfaces of the filter material layer. In this embodiment, the filter material layer is completely surrounded by the coating layer.

The filter material layer preferably consists of a fixed, in particular grainy or granulate-type material. The provision of coating layers at least on the upper side and the lower side of this filter material layer reliably retains the actual filter material. The material of the coating layers is preferably selected such that these oppose the inflowing air flow with no or only minimal air resistance. Non-woven fabric is used in particular for the coating layer.

Active carbon is preferably used as the filter material. Active carbon with additives such as for instance catalysts, other odor-binding or odorous material-substances are also possible.

In filter elements which include a frame in which the odor filter is retained, this is preferably made up of four side walls, which form a rectangle. The height of the side walls is herewith greater than or equal to the height of the structure of the odor filter. The side walls herewith all have the same height.

According to an alternative embodiment, the height of the frame is nevertheless smaller than the height of the odor filter structure at least on one side of the frame. In this embodiment, the side walls of the frame which rest on the longitudinal edges of the odor filter can have a lower height than the side walls, which rest on the longitudinal ends of the odor filter. The edges of the odor filter are herewith referred to as longitudinal edges, which comprise a waved or folded shape in accordance with the shape of the odor filter. Part of the sides of the odor filter is herewith exposed and can therefore be used as an air entry or air exit surface.

According to a further aspect, the present invention relates to an extractor hood, which comprises a fan for drawing air into the extractor hood and at least one filter element for filtering out odorous substances from the air. The extractor hood is characterized in that the filter element is arranged downstream of the fan in the flow direction of the air and depressions are provided in the entry side of the filter element, said depressions being formed by an odor filter and extending at least over half of the height of the filter element.

By arranging the filter element downstream of the fan, the advantage is achieved in that the air to be cleaned of odorous substances can be pushed through the odor filter. By, with the inventive extractor hood, the filter element also comprising depressions in the entry side, a large filter surface is consequently provided with smaller dimensions of the filter element, in particular in the width and depth direction. These smaller dimensions of the filter element enable the filter element to be installed in a position which is downstream of the fan. Air is routed by the fan, via a tubular connecting piece, which is connected to the fan, to the filter element for instance. The air passing through the filter element and cleaned as a result subsequently exits via openings in the chimney or channel of the extractor hood, which surrounds the fan and the filter element. Depending on the form of the extractor hood, these exit openings may be provided for instance on three or four of the lateral surfaces of the channel.

The at least one filter element which is used in the inventive extractor hood is preferably a filter element according to the present invention. The extractor hood preferably represents a recirculation hood.

Advantages and features, which are described with respect to the inventive filter element, apply, insofar as applicable, accordingly to the inventive extractor hood and vice versa.

An improved odor filter is created with the present invention. With improved odor reduction, the flow resistance is herewith simultaneously reduced. The air volume flowing through the filter is as a result enlarged and the noise development reduced. By means of the present invention, the odor elimination is thus improved by the extractor hood, without reducing the volume flow too much and/or increasing the sound output level too much.

BRIEF DESCRIPTION OF THE DRAWINGS

The invention is described below again with the aid of the appended figures, in which;

FIG. 3 shows a schematic detailed view of the design of the odor filter according to an embodiment of the invention.

DETAILED DESCRIPTION OF EXEMPLARY EMBODIMENTS OF THE PRESENT INVENTION

Figure 1:
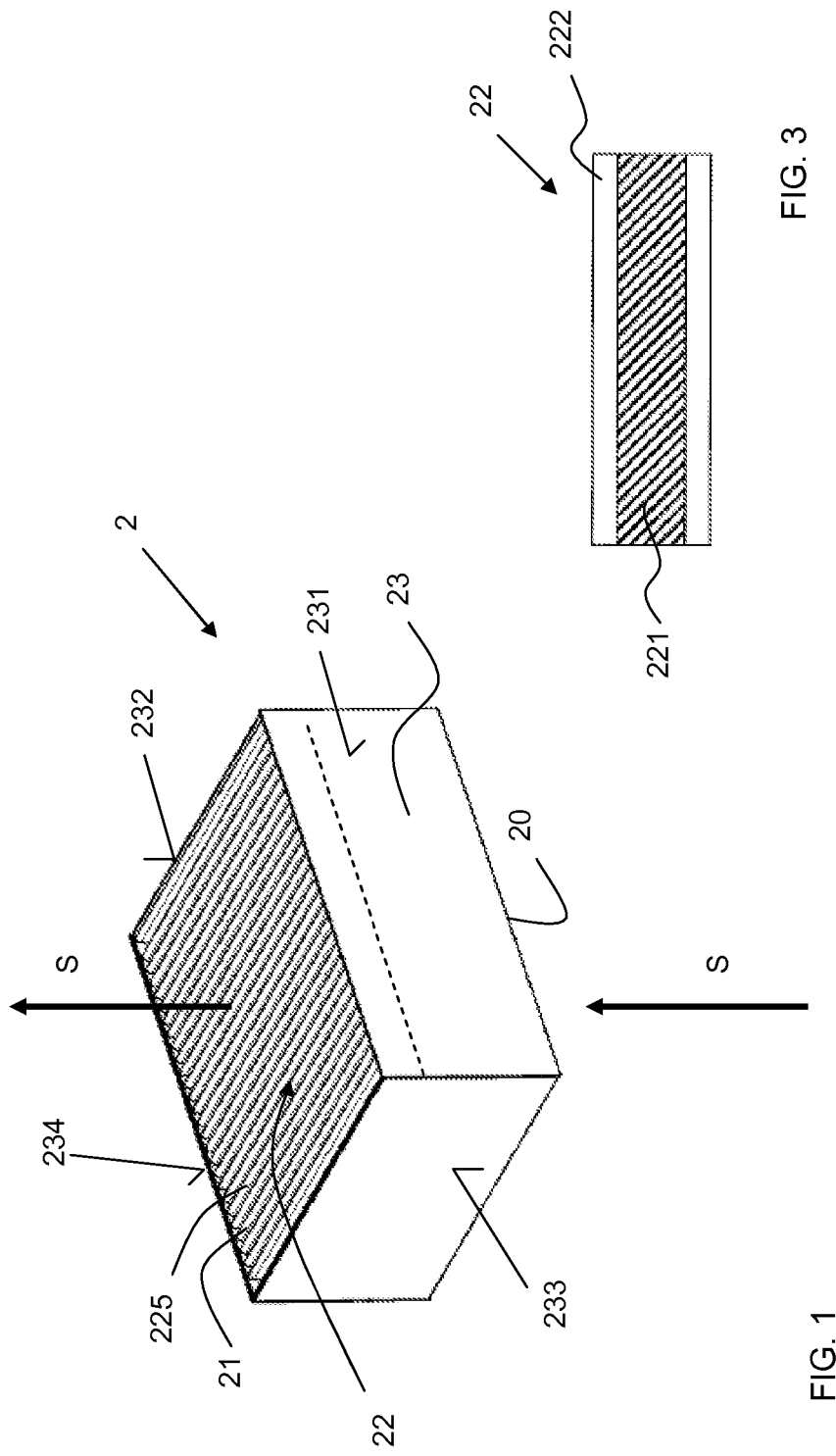
FIG. 1 shows a perspective view of an embodiment of the inventive filter element.
Figure 2:
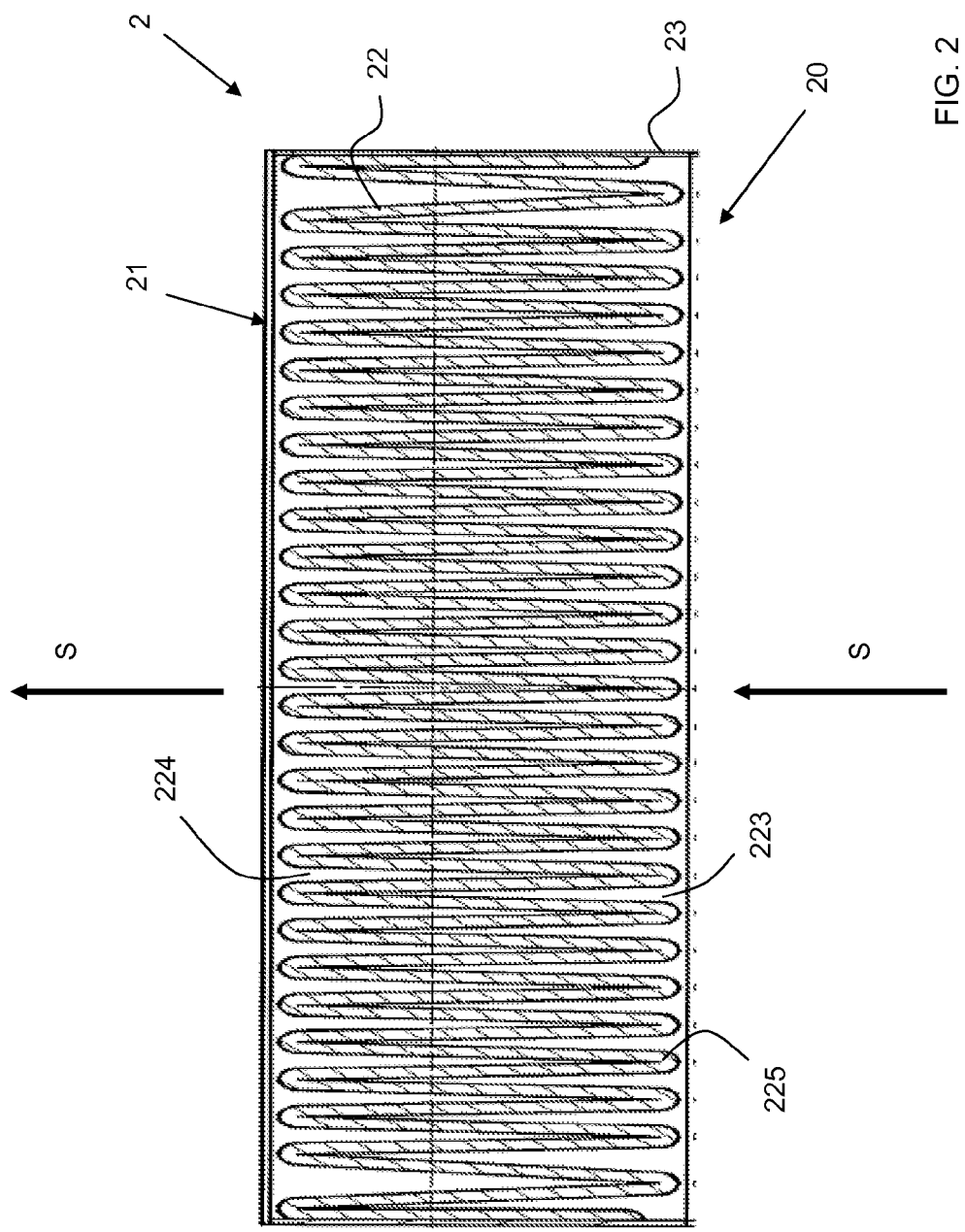
FIG. 2 shows a schematic longitudinal sectional view through the embodiment of the filter element according to FIG. 1.

FIG. 1 shows a schematic perspective view of an embodiment of the inventive filter element 2. The filter element 2 consists of a frame 23 and a filter 22 accommodated in the frame 23. The frame 23 is downwardly and upwardly open in the view shown, in other words it is only formed by lateral surfaces 231 to 234. The odor filter 22 is accommodated in the frame 23 such that this does not extend beyond the height of the frame 23. In the embodiment shown, the lower side of the frame 23 defines the entry side 20 of the filter element 2 and the upper side defines the exit side 21. The main flow direction of the air is indicated by the arrow S in the figures.

In the embodiment shown, the frame 23 defines a rectangular interior. The odor filter 22 is arranged in the interior of the frame 23.

The odor filter 22 comprises a planar basic form. One possible design of the odor filter is shown in FIG. 3. The odor filter 22 consists of a filter material 221, which is provided between two coating layers 222. The filter material 221 may represent active carbon granulate for instance. Non-woven material layers can be used as coating layers 222. The function of the coating layers 222 is herewith in particular to hold the filter material 221.

The thus embodied layer-type odor filter 22 is molded into the frame 23 prior to introduction. In particular, the layer is folded or waved along the width or length of the odor filter 22.

The thus waved or folded odor filter 22 is introduced into the frame 23 and is connected to the frame 23 on the sides. For instance, the odor filter 22 is fixed with adhesive to the frame 23.

In the embodiment shown in the Figures, the odor filter 22 features a folded structure. The deflection points 225 of the fold or waves rest on the upper side and the lower side of this folded structure. Depressions 223, 224 are formed on the upper side and the lower side of the folded structure in each instance between adjacent deflection points 225. The width of the depressions 223, 224 on the upper side and the lower side of the folded structure is minimal and may be 5 mm for instance. The odor filter 22 is therefore tightly packed in the frame 23 by means of the folded structure, in other words, largely fills the same. The height of the frame 23 is also largely or completely covered by the folded structure. In particular, the vertical distance between the upper deflection points 225 and the lower deflection points 225 preferably corresponds to the height of the side walls 231-234 of the frame.

As indicated in FIG. 1 by the dashed line, according to a further embodiment the height of the side walls 231 and 234 can be smaller than the height of the folded structure of the odor filter 22. The upper deflection points 225 and the upper region of the depressions 224 are herewith open to the sides.

Figure 4:
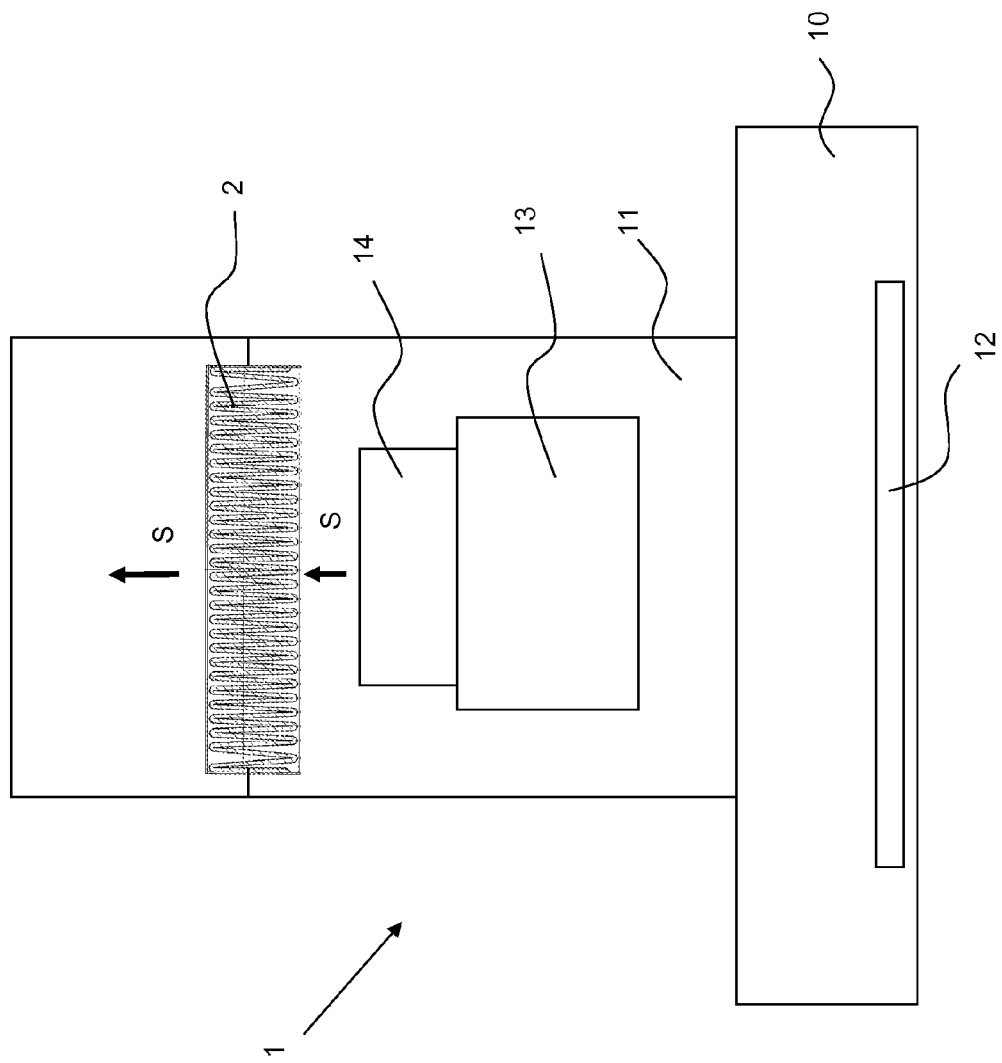
FIG. 4 shows a schematic sectional view of an embodiment of the inventive extractor hood.

FIG. 4 shows an embodiment of an inventive extractor hood 1. The extractor hood 1 consists of a viewing screen 10 and a chimney or channel 11 extending above the viewing screen 10. A grease filter 12 is provided in the viewing screen 10. The fan 13, which is also referred to as fan of the extractor hood, is arranged in the channel 11. A tubular connecting piece 14 is provided on the fan 13, which extends upwards from the fan 13. An inventively embodied filter element 2 is arranged above the tubular connecting piece 14 in the upper region of the channel 11.

The filter element 2 is thus accommodated in the channel 11 such that the entry side 20 is directed downwards in the direction of the fan 13.

Air from the room in which the extractor hood 1 is installed is drawn into the extractor hood via the fan 13. The air is herewith freed of droplet-type and solid impurities at the grease filter 12. The thus pre-cleaned air then reaches the fan 13 via which it is transported in the direction of the filter element 2 via the tubular connecting piece 14. The pre-cleaned air which is nevertheless still loaded with odorous substances enters the filter element 2 via the entry surface 20. The air reaches the interior of the odor filter via the deflection points 225 of the odor filter 22, and after passing through the lower coating layer 222 thus reaches the filter material 221. Furthermore, the air from the fan 13 enters the depressions 223 which are formed between the deflection points. Air herewith enters the odor filter 22 via the surfaces of the odor filter 22 which are inclined relative to the main flow direction of the air S, said surfaces bounding the depressions 223. The overall lower side of the odor filter 22 which is present in the folded shape is therefore used as an entry surface into the odor filter 22, which is also referred to as filter surface.

After penetrating the filter material 221 and the upper coating layer 222, the thus cleaned air can leave the odor filter 22 over its entire upper surface, in other words over the deflection points 225 and the inclined surfaces of the depressions 224. After leaving the filter element 2 via the exit side 21, which is bounded by the frame 23, the air can be conveyed back in to the room in which room the extractor hood 1 is operated, via openings (not shown) on the channel 11.

The present invention comprises a series of advantages. In particular, a possibility is created of producing the largest possible filter surface in a horizontally limited installation space. The odor reduction is herewith increased on the one hand and the air flow in the extractor hood is only marginally impaired on the other hand, as a result of which the drop in pressure on the filter element and thus also the noise development are minimized. Finally, the inventive filter element can be easily manufactured and assembled in an extractor hood, in particular above the fan.

LIST OF REFERENCE CHARACTERS

1 Extractor hood
10 Viewing screen
11 Channel
12 Grease filter
13 Fan
14 Tubular connecting piece 2 Filter element
20 Entry side
21 Exit side
22 Odor filter
221 Filter material
222 Coating layer
223 Depressions
224 Depressions
225 Deflection point
23 Frame
231-234 Lateral surfaces
S Main flow direction

The invention claimed is:

1. A filter element for an extractor hood, said filter element comprising an odor filter having a plurality of parallel, longitudinally extending depressions with depression openings provided in an entry side of the filter element wherein each depression extends vertically at least over half of a height of the filter element resulting in a pleated filter configuration; and a frame for holding the odor filter, wherein the odor filter includes a vertically extending side extending longitudinally in parallel with the depressions, wherein the side of the odor filter is adhered to a side of the frame throughout the longitudinal extent of the side of the odor filter, wherein the depressions that are adjacent each side of the frame are open wider than depressions that are not adjacent each side of the frame whereby the pleated filter configuration is asymmetrical.

2. The filter element of claim 1, wherein the odor filter has a constant thickness over its surface.

3. The filter element of claim 1, wherein the odor filter is sized in one of two ways, a first way in which the odor filter has a length which is greater than a width of the filter element, a second way in which the odor filter has a width which is greater than a depth of the filter element.

4. The filter element of claim 1, wherein the frame is constructed to hold the odor filter at edges of the filter.

5. The filter element of claim 1, wherein the odor filter is folded or waved.

6. The filter element of claim 5, wherein the folds or waves run in a width or depth direction of the filter element in the odor filter.

7. The filter element of claim 1, wherein the odor filter includes a filter material layer having opposite surfaces, each of which being covered with a coating layer.

8. The filter element of claim 4, wherein the frame has a height which is smaller at least on one side of the frame than a height of the odor filter.

9. An extractor hood, comprising:
a fan for drawing air into the extractor hood;
at least one filter element for filtering out odorous substances from the air, said filter element for filtering out odorous substances being arranged downstream of the fan in a main flow direction of the fan and including an odor filter provided with a plurality of parallel, longitudinally extending depressions with depression openings in an entry side of the odor filter resulting in a pleated filter configuration, said depressions extending vertically at least over half of a height of the filter element; and a frame for holding the odor filter, wherein the odor filter includes a vertically extending side extending longitudinally in parallel with the depressions, wherein the side of the odor filter is adhered to a side of the frame throughout the longitudinal extent of the side of the odor filter, and wherein the depressions that are adjacent each side of the frame are open wider than depressions that are not adjacent each side of the frame whereby the pleated filter configuration is asymmetrical, and
at least one filter element for filtering out grease and other particulate matter, said filter element for filtering out grease and other particulate matter being arranged upstream of the fan in a main flow direction of the fan, wherein the fan draws air through said filter element for filtering out grease and other particulate matter and wherein the fan blows air through said filter element for filtering out odorous substances.

10. The extractor hood of claim 9, wherein the odor filter has a constant thickness over its surface.

11. The extractor hood of claim 9, wherein the odor filter is sized in one of two ways, a first way in which the odor filter has a length which is greater than a width of the filter element, a second way in which the odor filter has a width which is greater than a depth of the filter element.

12. The extractor hood of claim 9, wherein the frame is constructed to hold the odor filter at edges of the filter.

13. The extractor hood of claim 9, wherein the odor filter is folded or waved.

14. The extractor hood of claim 13, wherein the folds or waves run in a width or depth direction of the filter element in the odor filter.

15. The extractor hood of claim 9, wherein the odor filter includes a filter material layer having opposite surfaces, each of which being covered with a coating layer.

16. The extractor hood of claim 12, wherein the frame has a height which is smaller at least on one side of the frame than a height of the odor filter.

17. A filter element for an extractor hood, said filter element comprising an odor filter having depressions provided in an entry side of the filter element and extending at least over half of a height of the filter element and a frame for holding the odor filter, wherein the frame has a height which is smaller at least on one side of the frame than a height of the odor filter.

* * * * *